United States Patent [19]

Gray

[11] Patent Number: 5,656,765

[45] Date of Patent: Aug. 12, 1997

[54] AIR/FUEL RATIO CONTROL DIAGNOSTIC

[75] Inventor: Michael David Gray, Milford, Mich.

[73] Assignee: General Motors Corporation, Detroit, Mich.

[21] Appl. No.: 496,070

[22] Filed: Jun. 28, 1995

[51] Int. Cl.$^6$ ...................................................... F01N 3/20
[52] U.S. Cl. .......................... 73/23.32; 73/118.2; 60/276
[58] Field of Search ................................ 73/23.32, 23.31, 73/118.2; 60/276, 277, 285

[56] References Cited

U.S. PATENT DOCUMENTS

| | | | |
|---|---|---|---|
| 4,344,317 | 8/1982 | Hattori et al. | 73/23.32 |
| 5,052,361 | 10/1991 | Ono et al. | 73/23.32 |
| 5,255,515 | 10/1993 | Plumenstock . | |
| 5,396,765 | 3/1995 | Maruyama et al. | 60/276 |
| 5,414,995 | 5/1995 | Tokuda et al. | 60/276 |
| 5,417,099 | 5/1995 | Ohuchi | 73/23.32 |
| 5,426,935 | 6/1995 | Ogawa et al. | 60/276 |
| 5,426,937 | 6/1995 | Ohuchi et al. | 60/276 |
| 5,431,011 | 7/1995 | Casarella et al. . | |
| 5,440,877 | 8/1995 | Kamura et al. | 60/276 |
| 5,473,889 | 12/1995 | Ehard et al. | 60/276 |

OTHER PUBLICATIONS

SAE Paper 900062—Detection of Catalyst Performance Loss Using On-Board Diagnostics—Clemmens et al—Feb. 26–Mar. 2, 1990.

SAE Paper 910561 Detection of Catalyst Failure On–Vehicle Using The Dual Oxygen Sensor Method—Koupal et al.—Feb. 25–Mar. 1, 1991.

U.S. application No. 08/377,703, Theis filed Nov. 14, 1994.

*Primary Examiner*—George M. Dombroske
*Assistant Examiner*—Eric S. McCall
*Attorney, Agent, or Firm*—Michael J. Bridges

[57] ABSTRACT

An automotive internal combustion engine air/fuel ratio control system is diagnosed by monitoring the oxygen content of catalytically treated engine exhaust gas for sustained deviations into regions of saturation in which the catalytic treatment device is characterized by low treatment efficiency. The oxygen content of catalytically treated engine exhaust gas is periodically sampled under test conditions and the samples processed into representative values for comparison to a predetermined range. Persistent excursions outside the range indicate a fault condition in which the air/fuel ratio control system operation is not supportive of efficient exhaust gas aftertreatment.

10 Claims, 6 Drawing Sheets

AIR/FUEL RATIO CONTROL DIAGNOSTIC

FIELD OF THE INVENTION

This invention relates to internal combustion engine diagnostics and, more particularly, to diagnosing fault conditions in an internal combustion engine air/fuel ratio control system.

BACKGROUND OF THE INVENTION

Figure 1:
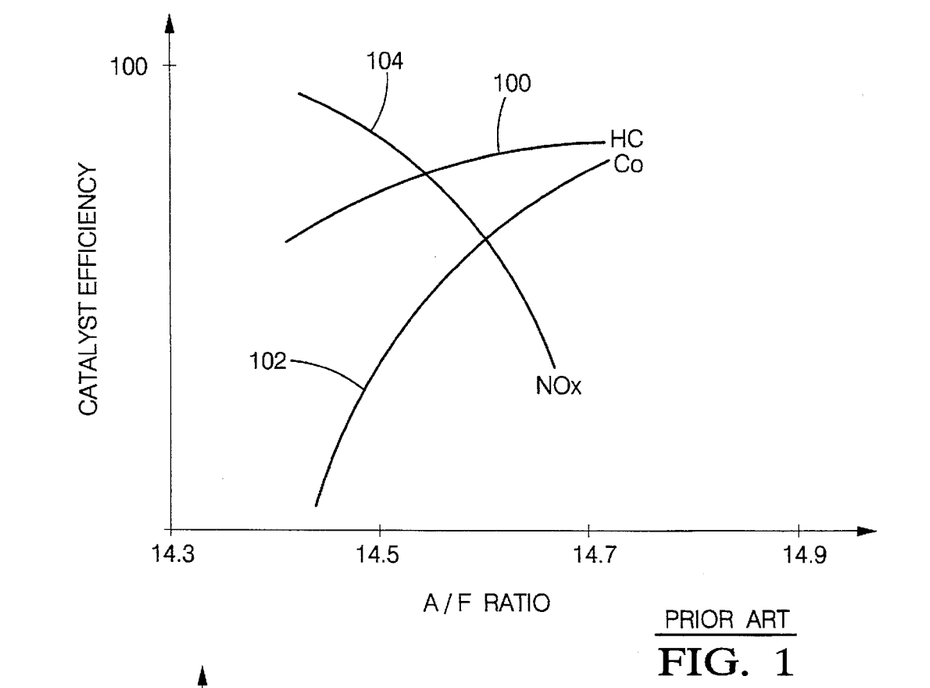
FIG. 1 is a graphical illustration of the typical effect of engine air/fuel ratio on catalyst efficiency in a conventional catalytic treatment means.

It is well-established in automotive internal combustion engine controls that conventional engine exhaust gas catalytic treatment devices operate at high efficiency when the engine air/fuel ratio is controlled substantially at the stoichiometric ratio, as illustrated by the curves 100, 102, and 104 of FIG. 1, representing the efficiency in treating the exhaust gas constituent elements of hydrocarbons HC, carbon monoxide CO and oxides of nitrogen NOx, respectively, as a function of engine air/fuel ratio. Feedback signals indicating air/fuel ratio control performance are provided by engine exhaust gas oxygen sensors which have a characteristic output "S" voltage curve, such as curve 110 of FIG. 2. Actual engine air/fuel ratio information may be provided by monitoring the output signal of an oxygen sensor positioned in the engine exhaust gas path upstream, according to the normal direction of exhaust gas flow, from the catalytic treatment device. The performance of the overall engine emissions control system including that of the air/fuel ratio control system and the exhaust gas treatment system may be determined by monitoring the output of an oxygen sensor positioned in the exhaust gas path downstream, according to the normal direction of exhaust gas flow, from the catalytic treatment device.

Figure 2:
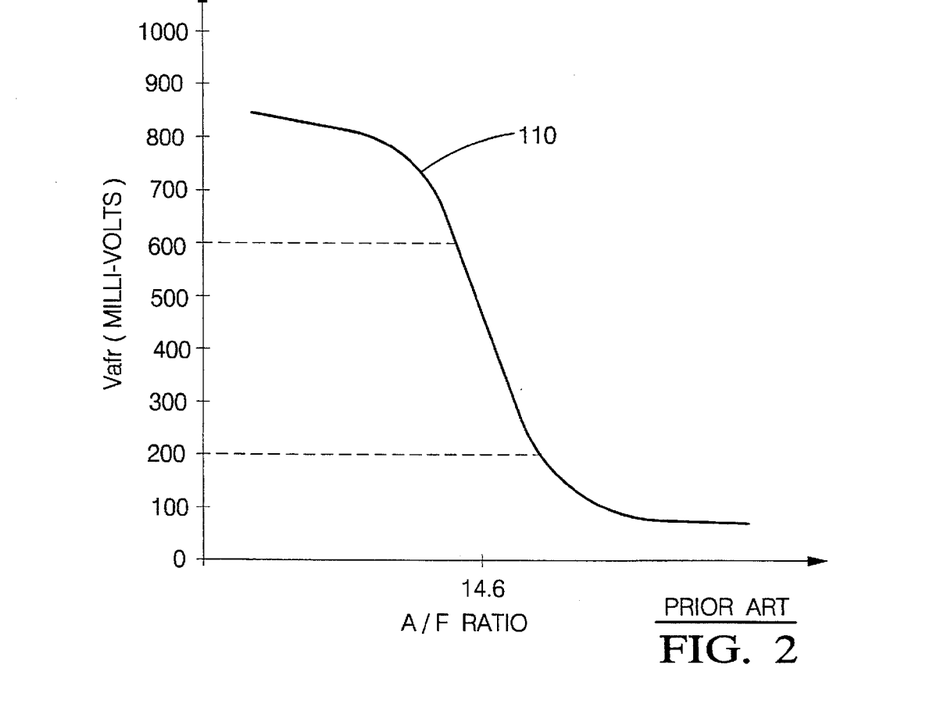
FIG. 2 is a graphical illustration of a typical exhaust gas oxygen sensor "S" curve.
Figure 3:
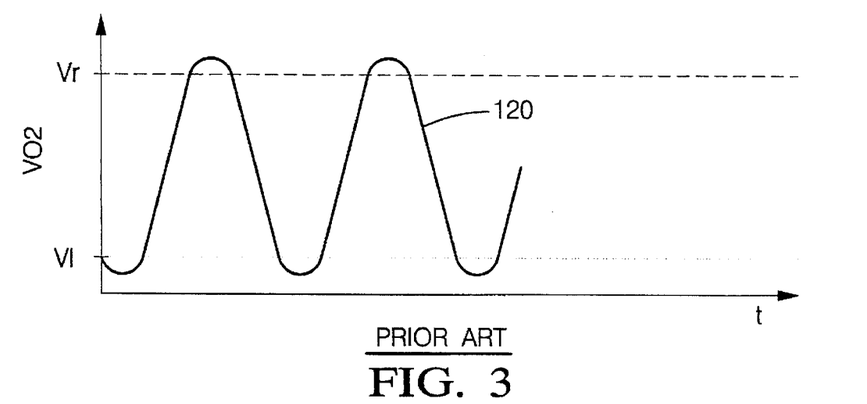
FIGS. 3–5 graphically illustrate the post-converter exhaust gas oxygen sensor output signal characteristic for varying performance levels of the engine and exhaust gas treatment systems.

When the downstream oxygen sensor output signal is within a predetermined voltage range defined by lower voltage Vl and upper voltage Vr, which may be approximately 200 and 600 millivolts, respectively, for a typical zirconium oxide sensor as illustrated by curve 110 of FIG. 2, a healthy catalytic treatment device should operate efficiently. Any signal deviation outside the predetermined voltage range should be rapidly driven back into the range through the activity of the closed-loop engine air/fuel ratio controller, and through the oxygen storage and release activity of the conventional catalytic treatment device. Signal 120 of FIG. 3 illustrates a typical output signal pattern for a downstream oxygen sensor in a properly operating engine and emissions control system with a high catalytic treatment efficiency, indicated by only temporary excursions of the downstream sensor signal VO2 into saturation, indicated by a signal VO2 being below Vl or above Vr.

Figure 4:
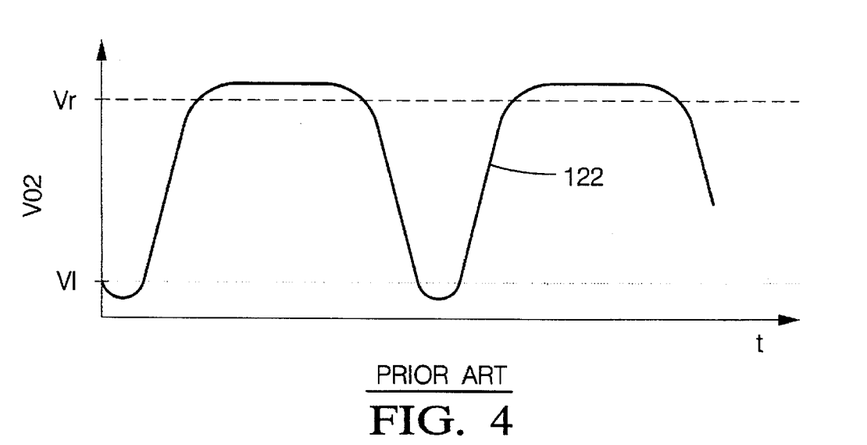
Figure 5:
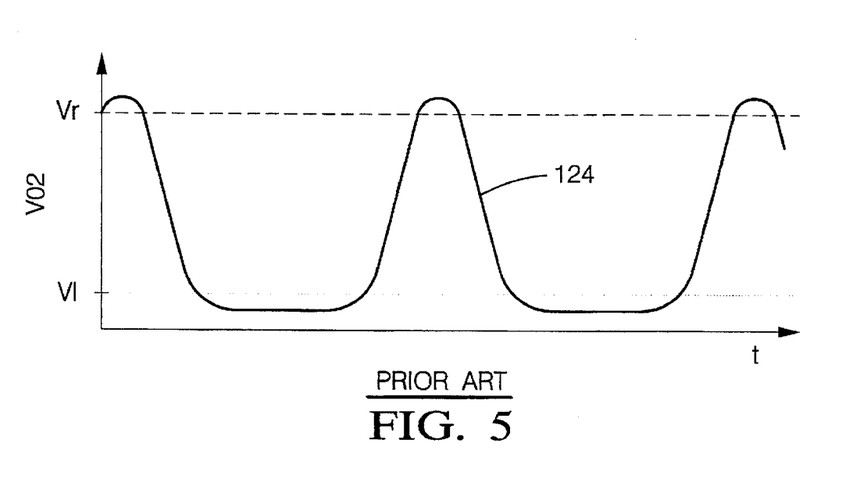

Downstream oxygen sensor voltage signal deviations outside the predetermined voltage range that persist for a significant amount of time indicate a system performance problem that may likely lead to a significant reduction in exhaust gas aftertreatment efficiency which, if left unremedied, may lead to substantial increase in vehicle emissions. Signal 122 of FIG. 4 illustrates a typical downstream oxygen sensor signal with a rich bias which may indicate an engine or emissions control system fault condition, such as may be caused by a heavily loaded evaporative canister, indicated by too significant an amount of time above the threshold signal voltage Vr, and signal 124 of FIG. 5 illustrates a potential fault condition corresponding to a lean bias of the downstream sensor, such as may be caused by a system air leak, indicated by too significant an amount of time below the threshold signal voltage Vl.

Proposed diagnostics to detect performance deterioration in specific engine and exhaust system components are typically complex, throughput intensive, and expensive to incorporate, making them poorly suited to applications requiring system level diagnostics with even reasonable controller throughput and cost constraints, and making them difficult to install, calibrate and maintain.

It would therefore be desirable to develop a simple, inexpensive, yet reliable engine control system diagnostic, especially to diagnose whether the engine air/fuel ratio controller is operating in a manner supporting efficient operation of the catalytic treatment device.

SUMMARY OF THE INVENTION

The present invention is directed to a desirable engine control system diagnostic for determining and indicating conditions that reduce the efficiency of operation of a catalytic treatment device through a simple, unintrusive procedure which adds little additional controller throughput burden and which is relatively easy to install, calibrate and maintain.

More specifically, the present diagnostic diagnoses deviation in exhaust gas treatment performance by monitoring the condition of the post-converter oxygen sensor, located in a position in the engine exhaust gas path downstream, according to the direction of exhaust gas flow, from the catalytic treatment device. The output signal of the sensor is monitored for deviations into saturation regions defined by predetermined voltage threshold values. Sustained operation in a saturation region indicates a potential engine control or emissions control system problem, such as a poorly responding engine air/fuel ratio control, a deterioration in the oxygen storage and release capacity of the catalytic converter, an air leak in the system, or a heavily loaded evaporative system canister. The time of operation in a saturation region is determined through a post-converter oxygen sensor sampling process while closed-loop air/fuel ratio control is active, and while operating conditions are present in which engine exhaust gas volume is relatively high, such as during engine acceleration and high speed cruising. Several samples of the post-converter exhaust gas oxygen concentration are taken during the sampling process. The relationship of the samples to a predetermined threshold value representing the threshold into the closest saturation region then indicates the performance of the system in supporting efficient engine emissions reduction. If the relationship indicates unacceptably low efficiency, a fault condition may be indicated such as by storing information in non-volatile memory device indicating the condition, and by notifying the vehicle operator so that appropriate action may be taken to identify the source of the condition and to make appropriate correction.

BRIEF DESCRIPTION OF THE DRAWINGS

The invention may be best understood by reference to the preferred embodiment and to the drawings in which.

DESCRIPTION OF THE PREFERRED EMBODIMENT

Figure 6:
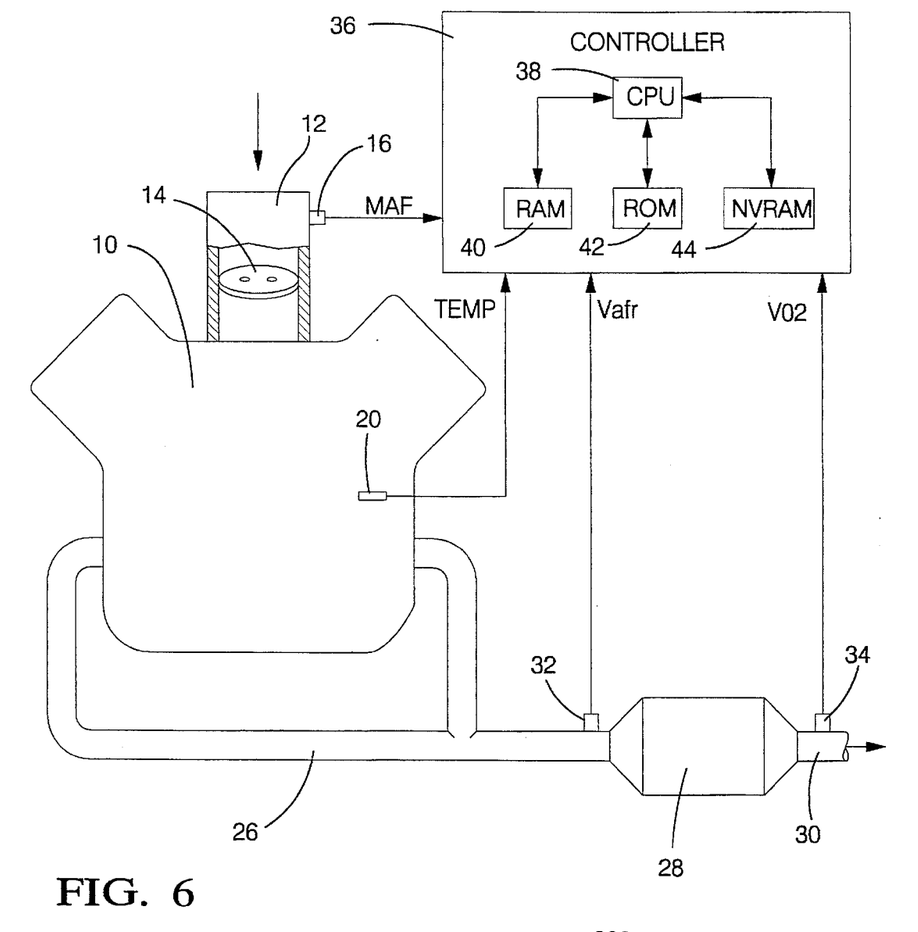
FIG. 6 is a general schematic drawing of the engine control and diagnostic hardware of the preferred embodiment.

Referring to FIG. 6, intake air received in internal combustion engine 10 past intake air or throttle valve 14 is combined with an injected fuel quantity for combustion in any of a plurality of engine cylinders (not shown), producing exhaust gasses which are guided out of the engine via exhaust gas conduit 26 to a catalytic treatment device 28, which may be a conventional three-way catalytic converter. The treated exhaust gas passes out of the device 28 through exhaust pipe 30 for release to the atmosphere.

Conventional oxygen concentration sensors 32 and 34, which may be conventional zirconium oxide sensors, are positioned in the conduit 26 and tailpipe 30, respectively, on either side of the converter 28. Upstream sensor 32 is positioned upstream of the converter 28 along the normal direction of flow of engine exhaust gas, and downstream sensor 34 in tailpipe 30 is positioned downstream of the converter 28 along the normal direction of flow of engine exhaust gas. Upstream sensor 32 transduces the concentration of oxygen passing through the conduit 26 by the sensor 32 prior to catalytic treatment thereof by catalytic treatment device 28, and outputs signal Vafr indicative thereof, for example for use as a measure of actual engine air/fuel ratio in a conventional closed-loop air/fuel ratio control process. Downstream sensor 34 transduces the concentration of oxygen passing through the pipe 30 after treatment thereof by the catalytic treatment device 28, and outputs signal VO2 indicative thereof, for example for use in the diagnostic process of this embodiment, to be described.

Engine intake mass airflow rate is sensed through conventional mass airflow sensor 16, such as a hot wire device or other generally available airflow sensor which outputs signal MAF indicating the mass of intake air passing thereby. Engine coolant temperature sensor 20, such as a conventional thermocouple or thermistor placed in or in proximity to a path of circulation of engine coolant (not shown) transduces engine coolant temperature into output voltage signal TEMP.

Conventional engine controller 36, such as a single-chip microcontroller including such generally-known elements as a central processing unit CPU 38, random access memory device RAM 40, read only memory device ROM 42, and non-volatile memory device NVRAM 44. The CPU further includes a conventional arithmetic logic circuit (not shown) for carrying out such operations as sampling input signals, such as signal VO2, and carrying out mathematical operations, such as manipulating input signal samples through predetermined formulae, such as formulae representing lag filter processes stored in controller read only memory 42, comparing samples to thresholds, etc. as is generally understood in the art. More generally, the elements of the controller 36 operate to provide for sampling of input signals, such as including the described signals, MAF, TEMP, Vafr, and VO2 and, through execution of a series of controller operations stored in the form of controller instructions in ROM 42, processes the input signals and generates a series of output control and diagnostic output signals for application to common engine control actuators and engine diagnostic indicators.

Figure 7:
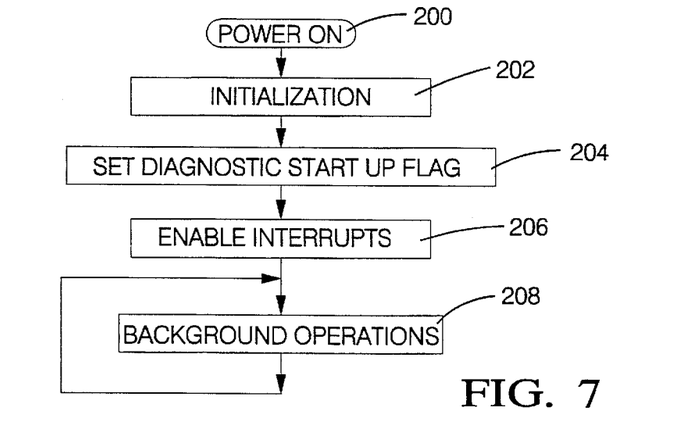
FIGS. 7-10 are computer flow diagrams illustrating a series of controller operations for carrying out the diagnostic of this invention in accord with the preferred embodiment.

Included in the controller instructions are the operations illustrated in FIGS. 7-10 for carrying out engine and emission control system diagnostics. Generally, such operations provide for detection of appropriate test conditions and, when such conditions are present, samples, filters, and analyzes the signal VO2 to determine whether the downstream oxygen sensor is persisting in a saturation condition indicating an improperly responding air/fuel ratio control and a resulting low efficiency emission treatment system. The operations of FIG. 7 are initiated upon power-up of the controller 36 of FIG. 1, such as when ignition power is manually applied to the controller 36 by the vehicle operator. The controller is configured to automatically initiate the operations of FIG. 7 when ignition power is applied to the controller, beginning at an initial step 200 and proceeding to a next step 202 at which standard initialization operations are provided, including setting pointers, flags, and counters to predetermined initial values and by clearing memory locations for use in controller operations. A diagnostic startup flag is next set at a step 204 for use in the routine of FIG. 8. Interrupts, including standard timer and event-based interrupts are enabled to occur following time intervals or following control events at a next step 206, including a timer interrupt setup to occur at least every fifty milliseconds while the controller 36 is operating. The interrupt of at least fifty milliseconds is enabled and is pre-configured to direct controller operations to the routine of FIG. 8, to be described. After enabling the interrupts, background operations are carried out at a next step 208. Such operations may include any low priority operations required to be executed repeatedly while the controller is operating, including conventional system diagnostic and maintenance operations generally known in the art, which may be temporarily suspended upon the occurrence of the enabled timer and event-based interrupts.

Figure 8:
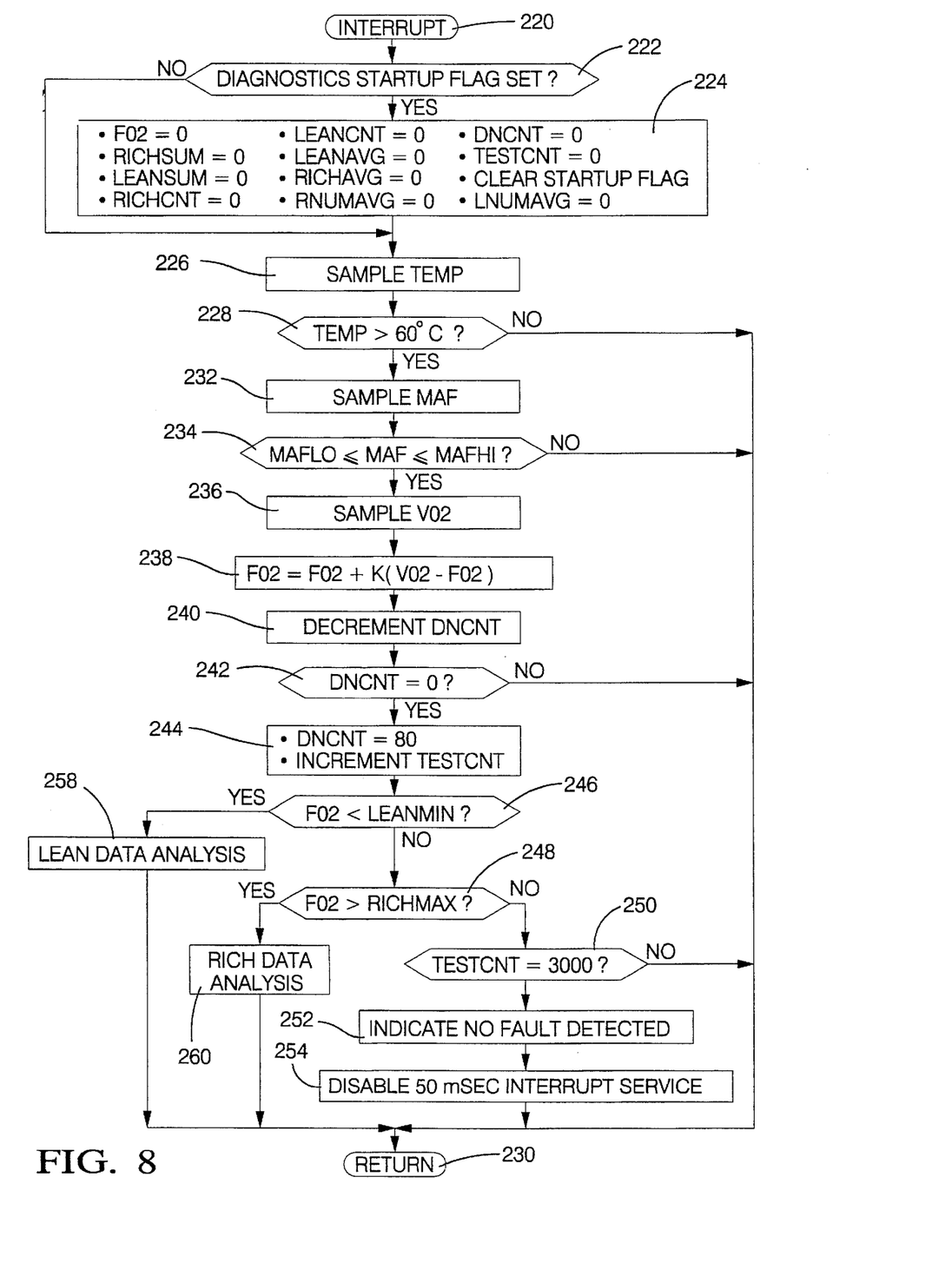

For example, upon occurrence of the timer interrupt of at least fifty milliseconds that was enabled at the step 206, any current operations, such as the background operations of the step 208, are temporarily suspended to allow for servicing of the interrupt, which servicing includes execution of the operations of the routine of FIG. 8, beginning at a first step 220 and proceeding to a step 222 to determine the status of the startup flag. If the startup flag is set, indicating that the current iteration of the routine of FIG. 8 is the first since the power-up of the controller, a next step 224 is executed to set diagnostic values to initial values, such as by clearing random access memory locations having the labels of FO2, RICHSUM, LEANSUM, RICHCNT, LEANCNT, RNUMAVG, LNUMAVG and TESTCNT. Additionally, the memory location having label DNCNT is set to an initial value of eighty, LEANAVG is set to 200, RICHAVG is set to 600, and the startup flag is cleared.

Figure 9:
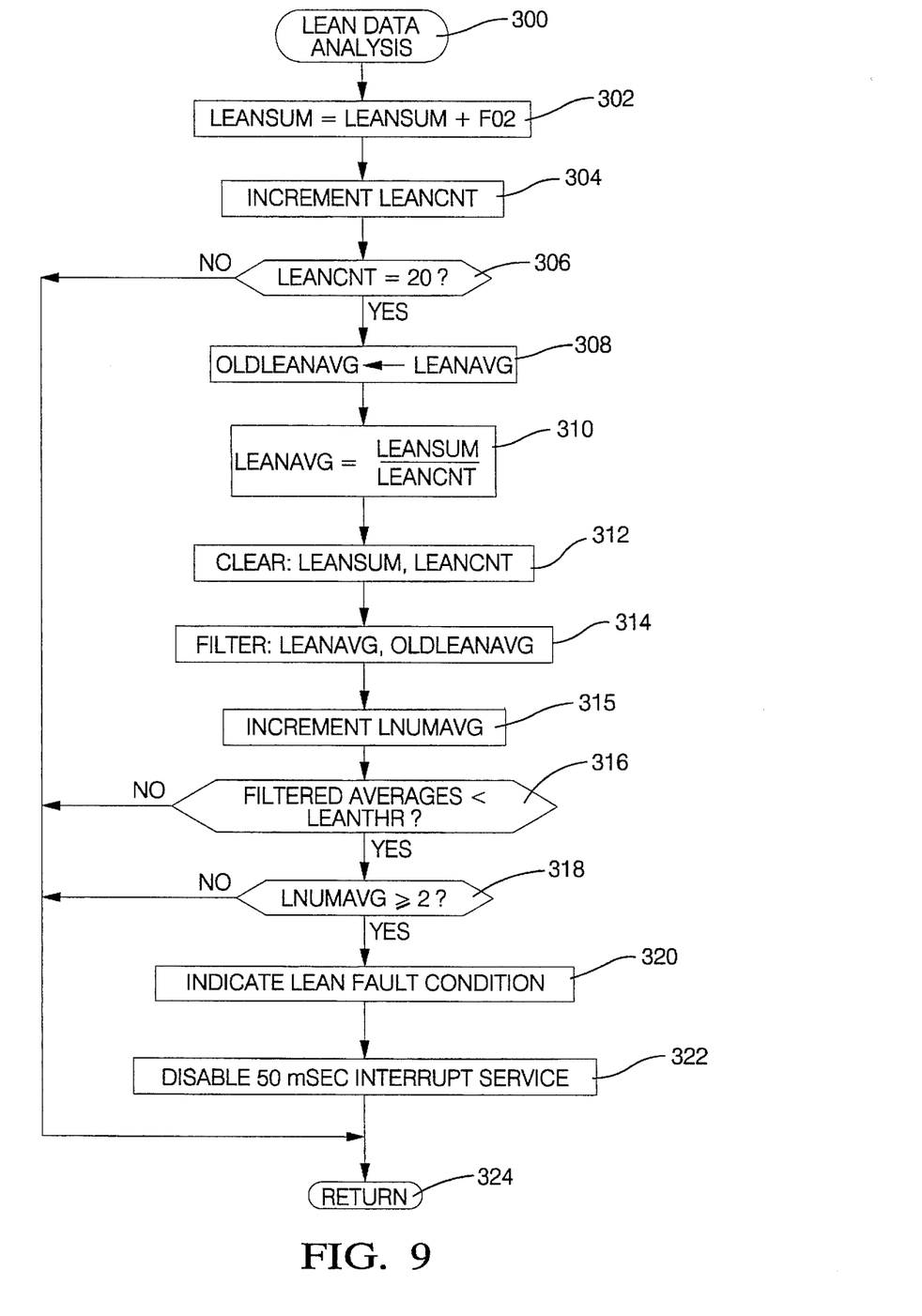

After initializing the values at the step 224, or if no initialization was determined to be required at the step 222, the input signal TEMP indicating engine coolant temperature is sampled at a next step 226. If TEMP exceeds sixty degrees Celsius at a next step 228, a first test condition requiring the engine to be sufficiently warmed up that it may be assumed that the oxygen sensors 32 and 34 of FIG. 1 are active, is met, and the signal MAF indicating engine intake airflow rate is next sampled at a step 232. A further test condition is analyzed at a next step 234 in which MAF is compared to a MAF range defined by a low MAF value MAFLO, of about ten grams per second, and a high MAF value MAFHI of about thirty grams per second. IF MAF is within the range, then a representative measure of the function of the air/fuel ratio control system may be made as is generally understood in the art, and the current diagnostic continues by proceeding to sample signal VO2 at a next step 236. The VO2 sample is next filtered in accord with a conventional lag filter process at a step 238 to form filtered value FO2, as follows $$FO2 = FO2 + K(VO2 - FO2)$$

in which K is a predetermined filter coefficient of about 0.1 in this embodiment. After filtering VO2, the count value DNCNT, used to monitor the number of VO2 samples used to form value FO2 is decremented at a next step 240. If DNCNT is determined to have been decremented to zero at a next step 242, then a sufficient number of samples have been incorporated into the formation of FO2 to assure a reasonable representation of the exhaust gas oxygen content downstream of the catalytic treatment device 28 of FIG. 1, and DNCNT is reset to eighty and a test counter TESTCNT is incremented at a next step 244 as a count of the number of valid FO2 values that have been generated. The FO2 value is next analyzed at steps 246 and 248, to determine whether it indicates the downstream oxygen sensor is operating in saturation, indicating a potential system failure. More specifically, if FO2 is less than a calibrated minimum oxygen sensor signal LEANMIN, which is set to 100 millivolts in this embodiment indicate the threshold voltage below which the sensor signal VO2 indicates the sensor is within the saturation region. If FO2 is less than LEANMIN, then a lean signal data analysis routine is executed at a next step 258 to analyze the lean sensor output signal information, through the operations of the routine of FIG. 9, to be described. After executing the operations of the routine of FIG. 9, the routine of FIG. 8 resumes by proceeding to a next step 230, at which the routine of FIG. 8 returns controller operations to any prior operations that were suspended upon occurrence of the interrupt that invoked the operations of FIG. 8.

Returning to step 246, if FO2 is not less than LEANMIN, then FO2 is next compared to a calibrated threshold voltage RICHMAX defining the voltage threshold above which the sensor signal VO2 indicates the sensor is operating within an upper saturation region. RICHMAX is set to about 800 millivolts in this embodiment. If FO2 exceeds RICHMAX at the step 248, a rich data analysis routine is next executed at a step 260, by executing the operations of the routine of FIG. 10 to analyze FO2 and any prior FO2 values to determine if the system has been operating in rich saturation for an extended period of time indicating a potential system fault condition under which the catalytic treatment device 28 of FIG. 1 may not be operating at a high level of catalytic treatment efficiency.

Figure 10:
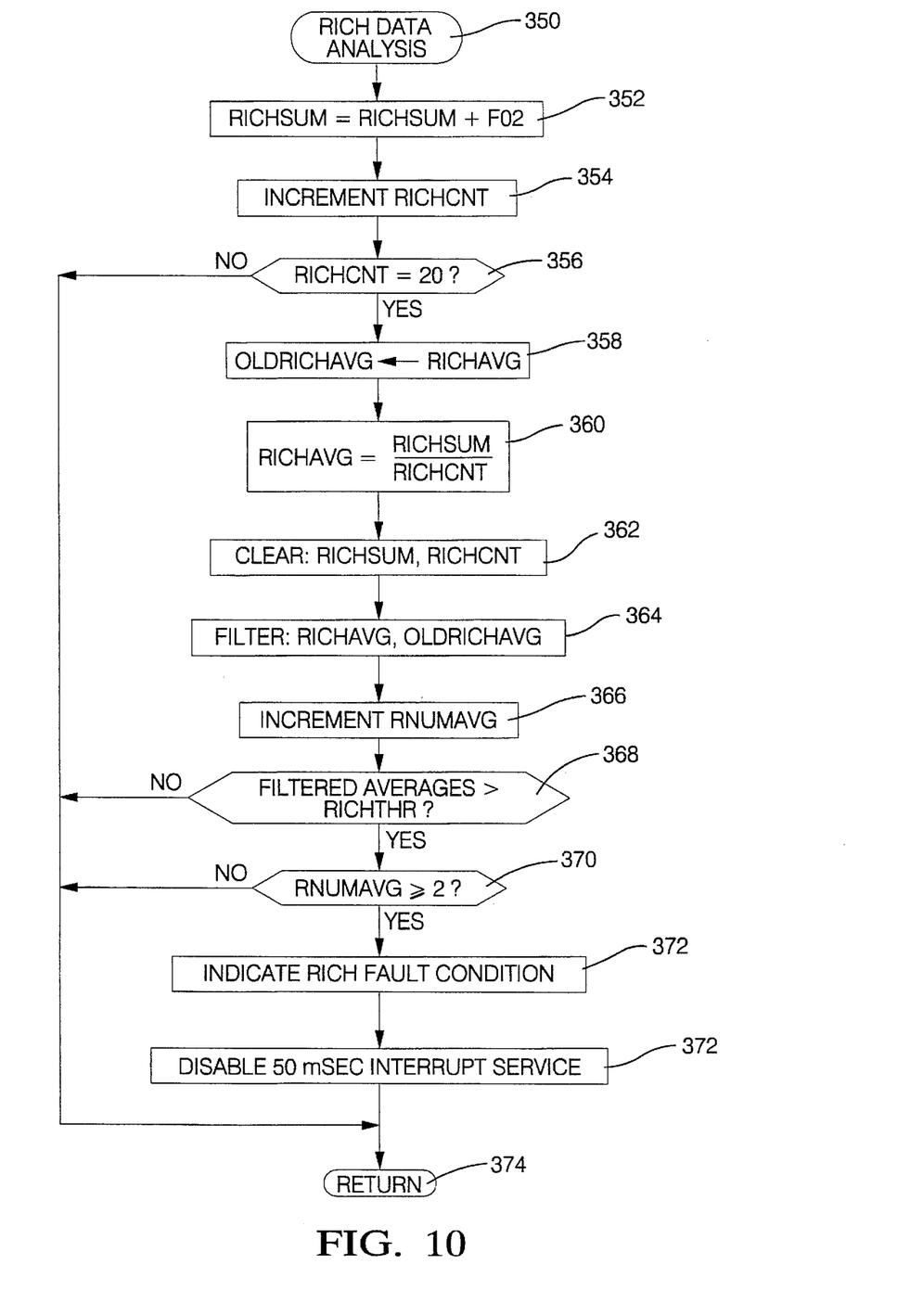

Upon completing execution of the operations of FIG. 10, the routine of FIG. 8 continues from the described step 260 to the described step 230 to return to any prior controller operations. Returning to the step 248, if FO2 was determined to not be greater than the threshold voltage RICHMAX, then the current filtered oxygen sensor signal indicates operation outside of saturation, such that exhaust gas conversion efficiency may be assumed to be at an acceptable level, and the routine moves to a next step 250, to compare TESTCNT to a calibrated value, such as about 3000 in this embodiment. If TESTCNT exceeds the calibrated value, then a sufficient amount of time outside saturation has occurred prior to any diagnosis of a fault condition though the operations of the routines of FIGS. 9 and 10 that the system may be diagnosed as "healthy" which corresponds to a sufficient amount of system operation outside of saturation to support efficient catalytic treatment of engine exhaust gas. For example, if, prior to 3000 samples being determined to be outside of saturation at the step 250, either the lean data analysis routine of FIG. 9 or the rich data analysis routine of FIG. 10 were to diagnose a fault condition, the fault would be stored and/or indicated, and the diagnostic operations would cease until the next controller power-up operation, such that the step 252 would not be executed. Accordingly, if the step 252 is executed, there has been no fault detected over a significant amount of analysis to indicate that the system is operating in a manner supporting efficient catalytic treatment of the engine exhaust gas and, to indicate such condition, the routine moves to a next step 252 to indicate that no fault condition has been detected, such as by storing a code in controller non-volatile memory. The interrupt used to initiate the routine of FIG. 8 is next disabled at a step 254 to prevent further air/fuel ratio control system diagnostics until the next engine startup. Alternatively, rather than disabling an interrupt, a flag may be set in controller memory indicating the current diagnostic is complete. Such a flag would then be checked upon each occurrence of the interrupt and, if set, the operations of the routine of FIG. 8 would not be executed following the interrupt. Such an alternative allows for continued use of the interrupt for other purposes, such as for carrying out other system control or diagnostic operations, for example that may be required periodically while the controller 36 is operating. After disabling the interrupt or, in the alternative embodiment, setting the described flag, the described step 230 is executed to return to any operations that were ongoing at the time of the interrupt. However, if TESTCNT does not exceed the calibrated value at the step 250, further information is required to complete the diagnostic of this embodiment, and the routine moves directly to the described step 230 without disabling the interrupt or setting the flag. Returning to the steps 228 and 234, if either test condition is not met, such as the TEMP signal being less than sixty degrees Celsius at the step 228 or the signal MAF being outside the predetermined range at the step 234, the diagnostic is not continued, as test conditions do not support accurate diagnostic analysis, by proceeding to the described step 230. Further, if DNCNT is not equal to zero at the step 242, more samples are required in the generation of an informational FO2 value, and the routine is exited via the step 230 to wait for the next interrupt to gather yet another VO2 sample.

The lean data analysis operations of FIG. 9 are executed when initiated at the described step 258 of FIG. 8 to analyze the filtered oxygen sensor samples found to be in the lower saturation region, to determine if the time in saturation indicates air/fuel ratio control performance not supporting highly efficient catalytic treatment of the engine exhaust gas. The routine begins at a step 300 and proceeds to a next step 302 at which LEANSUM, which is a sum of all FO2 values for the current diagnostic test that were determined to be less than the lower threshold LEANMIN, is updated by adding to it the current FO2 value. A count LEANCNT of all FO2 values used to form LEANSUM is next incremented at a step 304. If LEANCNT is equal to a calibrated threshold, set to twenty in this embodiment, at a next step 306, then enough FO2 values have been processed and incorporated into LEANSUM to yield a measure of the amount of deviation in sensed oxygen by downstream sensor 34 of FIG. 1 below the threshold LEANMIN to determine whether the deviation is a mere transient deviation or whether a significant deviation below LEANMIN is persisting, indicating a performance problem.

Accordingly, if LEANCNT is equal to twenty at the step 306, the sum of lean deviations is processed by first preserving a current lean signal average value LEANAVG as OLDLEANAVG at a step 308, and next by generating an average of the twenty FO2 values that was used to form LEANSUM at a next step 310 through a simple averaging process, for example by storing the quotient of LEANSUM divided by LEANCNT as LEANAVG. LEANSUM and LEANCNT are next cleared at a step 312 to allow for a next test iteration, and the two most recent average values are filtered through a conventional filtering process at a next step 314. The filtering process may be a conventional infinite impulse response filter taking the form of a common lag filter having a calibratable filter coefficient, set to about 0.3 in this embodiment. For example, the filter process may be as follows $$FAVG=OLDLEANAVG+C(LEANAVG-OLDLEANAVG)$$

in which FAVG is the filter output and C is the filter coefficient. After filtering the average values, a count of the number of average values incorporated into the filtered average is maintained by incrementing a stored count value LNUMAVG at a next step 315. The filtered averages are next compared to a predetermined lean threshold value LEANTHR defining the largest filtered average value that indicates operation within the lean (lower voltage) saturation region. LEANTHR is set to about 150 millivolts in this embodiment to indicate a threshold into a lean saturation range. Any filtered average value less in magnitude than the threshold LEANTHR indicates a sustained presence in saturation that will likely drive the catalytic treatment device 28 of FIG. 1 into a low efficiency operating range, as described. Accordingly, if the filtered average is less than LEANTHR at the step 316, and at least two averages were used in the formation of the filtered average value as determined by comparing LNUMAVG to two at a next step 318, then a lean fault condition is indicated at a next step 320, such as by storing a fault code in controller memory, by illuminating an indicator on a vehicle instrument panel (not shown), by energizing an aural alert means, such as a chime or tone, or by providing any means of indicating or storing a failure of the air/fuel ratio control system that may lead to reduced catalytic treatment efficiency, to support conventional repair or replacement activities. After indicating the failure or fault condition, the interrupt that invoked operation of the routine of FIG. 8, and thus of FIG. 9, is disabled at a step 322 so the diagnostic of FIG. 8 is not executed until the next time the controller 36 is turned on, such as following a vehicle startup operation. The manner of disabling the interrupt may be that described for the step 254 of FIG. 8. A step 324 is next executed to return to the operations following the step 258 of FIG. 8.

Returning to the step 318, if the number of averages used to form the filtered average value as indicated by LNUMAVG is less than two, further analysis is required to accurately diagnose the air/fuel ratio control system and the described step 324 is executed. Likewise, if LEANCNT was not yet incremented to twenty as determined at the step 306 or if the filtered averages were determined to not be less than LEANTHR at the step 316, the described step 324 is executed to return to the operations of FIG. 8.

The rich data analysis operations of FIG. 10 are executed when initiated at the described step 260 of FIG. 8, beginning at a first step 350 and proceeding to a next step 352 at which RICHSUM, which is a sum of all FO2 values for the current diagnostic test that were greater than the upper threshold RICHMAX, is updated by adding to it the current FO2 value. A count RICHCNT of all FO2 values used to form RICESUM is next incremented at a step 354. If RICHCNT is equal to a calibrated threshold, set to twenty in this embodiment, at a next step 356, then enough FO2 values have been processed and incorporated into RICHSUM to yield a measure of the amount of deviation in sensed oxygen by downstream sensor 34 of FIG. 1 above the threshold RICKMAX to determine whether the deviation is a mere transient deviation or whether a significant deviation above RICHMAX is persisting, indicating a performance problem.

Accordingly, if RICHCNT is equal to twenty at the step 356, the sum of rich deviations is processed by first preserving a current rich signal average value RICHAVG as OLDRICHAVG at a step 358, and next by generating an average of the twenty FO2 values that were used to form RICHSUM at a next step 360 through a simple averaging process, for example by storing the quotient of RICKSUM divided by RICHCNT as RICHAVG. RICHSUM and RICHCNT are next cleared at a step 362 to allow for a next test iteration, and the two most recent average values are filtered through a conventional filtering process at a next step 364. The filtering process may be a conventional infinite impulse response filter taking the form of a common lag filter having a calibratable filter coefficient, set to about 0.3 in this embodiment. For example, the filter process may be as follows $$FAVG=OLDRICHAVG+C(RICHAVG-OLDRICHAVG)$$

in which FAVG is the filter output and C is the filter coefficient. After filtering the average values, a count of the number of average values incorporated into the filtered average is maintained by incrementing a stored count value RNUMAVG at a next step 365. The filtered averages are next compared to a predetermined rich threshold value RICHTHR defining the largest filtered average value that indicates operation within the rich (upper voltage) saturation region. RICHTHR is set to about 750 millivolts in this embodiment to indicate a threshold into a rich saturation range. Any filtered average value greater in magnitude than the threshold RICHTHR indicates a sustained presence in saturation that will likely drive the catalytic treatment device 28 of FIG. 1 into a low efficiency operating range, as described. Accordingly, if the filtered average is greater than RICHTHR at the step 366, and at least two averages were used in the formation of the filtered average value as determined by comparing RNUMAVG to two at a next step 368, then a rich fault condition is indicated at a next step 370, such as by storing a fault code in controller memory, by illuminating an indicator on a vehicle instrument panel (not shown), by energizing an aural alert means, such as a chime or tone, or by providing any means of indicating or storing a failure of the air/fuel ratio control system that may lead to reduced catalytic treatment efficiency, to support conventional repair or replacement activities. After indicating the failure or fault condition, the interrupt that invoked operation of the routine of FIG. 8, and thus of FIG. 10, is disabled at a step 372 so the diagnostic of FIG. 8 is not executed until the next time the controller 36 is turned on, such as following a vehicle startup operation. The manner of disabling the interrupt may bee that described for the step 254 of FIG. 8. A step 374 is next executed to return to the operations following the step 260 of FIG. 8. Returning to the step 368, if the number of averages used to form the filtered average value as indicated by RNUMAVG is less than two, further analysis is required to accurately diagnose the air/fuel ratio control system and the described step 374 is executed. Likewise, if RICHCNT was not yet incremented to twenty as determined at the step 356 or if the filtered averages were determined to not be greater than RICHTHR at the step 366, the described step 374 is executed to return to the operations of FIG. 8.

The preferred embodiment for the purpose of explaining this invention is not to be taken as limiting or restricting this invention since many modifications may be made through the exercise of ordinary skill in the art without departing from the scope of the invention.

The embodiments of the invention in which a property or privilege is claimed are described as follows:

1. An air/fuel ratio control diagnostic method for diagnosing the performance of an automotive internal combustion engine air/fuel ratio control system in maintaining engine air/fuel ratio within an air/fuel range corresponding to efficient catalytic treatment of engine exhaust gas by a catalytic converter, comprising the steps of:

providing a signal indicating oxygen concentration of engine exhaust gas that has been treated by the catalytic converter;

defining an oxygen concentration signal range for the provided signal extending between a predetermined upper and a predetermined lower oxygen content signal threshold, and corresponding to efficient catalytic treatment of the exhaust gas;

initiating a test period;

periodically sampling the provided signal during the test period;

comparing the signal samples to the defined signal range to determine if any signal excursions outside the range occur;

estimating a duration of any signal excursions outside the defined signal range;

comparing the estimated duration of any signal excursions to a threshold duration; and indicating deteriorated air/fuel ratio control system performance if the estimated duration of any signal excursion exceeds the threshold duration.

2. The method of claim 1, wherein an oxygen sensor is disposed in an engine exhaust gas path downstream of the catalytic converter for providing the signal indicating the oxygen concentration, the method further comprising the steps of:

estimating temperature of the oxygen sensor; and comparing the estimated temperature to a predetermined sensor temperature threshold above which the sensor is within an operating range associated with accurate oxygen concentration sensing;

and wherein the initiating step initiates a test period when the estimated temperature is determined to be above the sensor temperature threshold.

3. An automotive internal combustion engine air/fuel ratio control diagnostic apparatus, comprising:

an engine exhaust gas conduit;

a catalytic treatment device disposed in the exhaust gas conduit for catalytically treating engine exhaust gas that has passed through the engine exhaust gas conduit;

an oxygen sensor exposed to the catalytically treated engine exhaust gas for transducing an oxygen content of the catalytically treated engine exhaust gas into an output signal;

sampling means for periodically sampling the output signal;

storing means for storing predetermined oxygen concentration values describing an oxygen concentration range corresponding to efficient operation of the catalytic treatment device;

estimating means for estimating a frequency with which the samples are within the oxygen concentration range over a predetermined test period;

comparing means for comparing the estimated frequency to a predetermined threshold frequency; and fault diagnosing means for diagnosing an air/fuel ratio control system fault condition if the estimated frequency does not exceed the threshold frequency.

4. The apparatus of claim 3, wherein the storing means comprises a read only memory device.

5. The apparatus of claim 3, wherein the sampling means comprises a microprocessor arithmetic logic circuit.

6. The apparatus of claim 3, wherein the estimating means further comprises:

filter means for filtering the samples to generate a filtered sample signal;

comparing means for periodically comparing the filtered sample signal to the oxygen concentration range; and accumulator means for accumulating the number of filtered sample signals that are within the oxygen concentration range over the predetermined test period to indicate the frequency with which the samples are within the oxygen concentration range over the predetermined test period.

7. The apparatus of claim 6, wherein the filter means comprises a lag filter process.

8. The apparatus of claim 6, wherein the comparing means comprises a microprocessor arithmetic logic circuit.

9. A method for diagnosing the performance of an automotive internal combustion engine air/fuel ratio control system, comprising the steps of:

catalytically treating engine exhaust gas;

transducing an oxygen content of the catalytically treated engine exhaust gas into an oxygen content signal;

storing an oxygen content signal range extending between first and second oxygen content signal threshold values;

periodically sampling the oxygen content signal over a predetermined test period;

comparing the oxygen content signal samples to the first oxygen content signal threshold value;

determining the number of samples that exceed the first oxygen content signal threshold value; and indicating that the performance of the air/fuel ratio control system is deteriorated if the number of samples exceeds a predetermined number.

10. The method of claim 9, further comprising the steps of:

comparing the oxygen content signal samples to the second oxygen content signal threshold value;

determining the number of samples that exceed the second oxygen content signal threshold value; and characterizing the performance of the air/fuel ratio control system as deteriorated if the number of samples exceeds a predetermined number.

* * * * *